United States Patent [19]
Daniels et al.
[11] 4,124,293
[45] Nov. 7, 1978

[54] CAM-OPERATED SCANNING OPTICS DRIVE FOR A CONTINUOUSLY VARIABLE MAGNIFICATION SYSTEM

[75] Inventors: Raymond A. Daniels; Paul Kummli, both of Boulder, Colo.

[73] Assignee: International Business Machines Corporation, Armonk, N.Y.

[21] Appl. No.: 819,020

[22] Filed: Jul. 25, 1977

Related U.S. Application Data

[63] Continuation of Ser. No. 749,123, Dec. 9, 1976, abandoned.

[51] Int. Cl.² .......... G03B 27/36
[52] U.S. Cl. .......... 355/58
[58] Field of Search .......... 355/55-58, 355/60, 66, 8, 11, 47-51

[56] References Cited

U.S. PATENT DOCUMENTS

| | | | |
|---|---|---|---|
| 3,614,222 | 10/1971 | Post et al. | 355/8 |
| 3,640,615 | 2/1972 | Schaeffer | 355/8 |
| 3,792,926 | 2/1974 | Knechtel et al. | 355/11 X |
| 3,897,148 | 7/1975 | Ritchie et al. | 355/58 X |
| 3,950,090 | 4/1976 | Washio et al. | 355/8 |
| 4,007,986 | 2/1977 | Komori et al. | 355/57 |

*Primary Examiner*—Donald A. Griffin
*Attorney, Agent, or Firm*—Charles E. Rohrer

[57] ABSTRACT

A continuously variable magnification optical system for use in document copier machines wherein multiple cams are used to provide motion input to the continuously variable drive system. Multiple cams are used in order to provide capability to the machine of copying at 1:1 reduction on various size copy papers without causing the scanning mechanism to scan beyond the usable length of the document glass. A cam-select mechanism is disclosed.

5 Claims, 5 Drawing Figures

CAM-OPERATED SCANNING OPTICS DRIVE FOR A CONTINUOUSLY VARIABLE MAGNIFICATION SYSTEM

This is a continuation of application Ser. No. 749,123 filed Dec. 9, 1976 and now abandoned.

This invention relates to continuously variable magnification systems, and more particularly to the use of such systems in document copiers, wherein different size copy papers are used. This patent application incorporates by reference U.S. patent application Ser. No. 721,125; filed Sept. 7, 1976. Related patent applications include U.S. patent application Ser. No. 721,124; filed Sept. 7, 1976; and U.S. patent application Ser. No. 749,137; filed Dec. 9, 1976 now abandon.

BACKGROUND OF THE INVENTION

In document copiers it is often desirable to afford the user the option of using more than one size copy paper. For example, it is customary in the U.S. to use 11-inch copy paper for most purposes but 14-inch copy paper is used to record legal size documents. Similarly, in other countries it is frequently desirable to provide the opportunity for the user to copy on more than one size paper.

In an optics system which magnifies or reduces the size of the document being copied, and wherein a scanning optical system is used, the scanning mechanism must travel, for example, 14 inches in order to copy a legal size document. If the copy is recorded onto legal size copy paper, the result is a 1:1 copy. To achieve reduction in such a system, the scanning velocity must be increased relative to the velocity of the copy paper (photoreceptive surface). To accomplish this with a drive which uses a mechanical velocity-multiplying scheme for reduction, the length of scan travel increases with an increase in scan velocity. Thus, if the machine is to achieve, for example, 0.647 reduction, the length of scan would be 14/0.647 or 21.64 inches long. Note however, that if 11-inch copy paper were in use, despite the 21.64-inch length of the scan, 0.647 reduction could accomodate paper of only 17-inch size and still place the entire document on the 11-inch copy paper. Therefore, the length of scan is much longer (21.64 inches) than the usable length of the document glass (17 inches). This not only means wasted space, but also means the size of the machine is larger than necessary.

The prior art shows U.S. Pat. No. 3,897,148 to Ritchie et al (IBM) which utilizes three cams, one of which is selected to provide a differing scan length and speed for the illumination carriage of a three-position reduction document copier machine. The system therein is directed to an optics system which has three discrete magnification ratios and is not directed to a system in which the magnification ratio is continuously variable between boundaries. Therefore, it is an object of this invention to provide a continuously variable reduction system in which it is possible to copy a plurality of documents at a 1:1 magnification ratio on various size copy paper and to provide continuously variable reduction of documents on a machine where the document glass size (or scan length) is not any larger than the largest size document to be reduced.

SUMMARY OF THE INVENTION

This invention consists of a plurality of cams and a select mechanism to shift from one cam to the other, wherein the selected cam supplies input motion to a continuously variable optics drive. By selecting one of the cams, the input velocity and displacement of the scanning optics can be controlled so that 1:1 copies of documents can be made onto different size copy papers and reduced copies can be reproduced as well.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

A DETAILED DESCRIPTION

Figures 1, 1A:
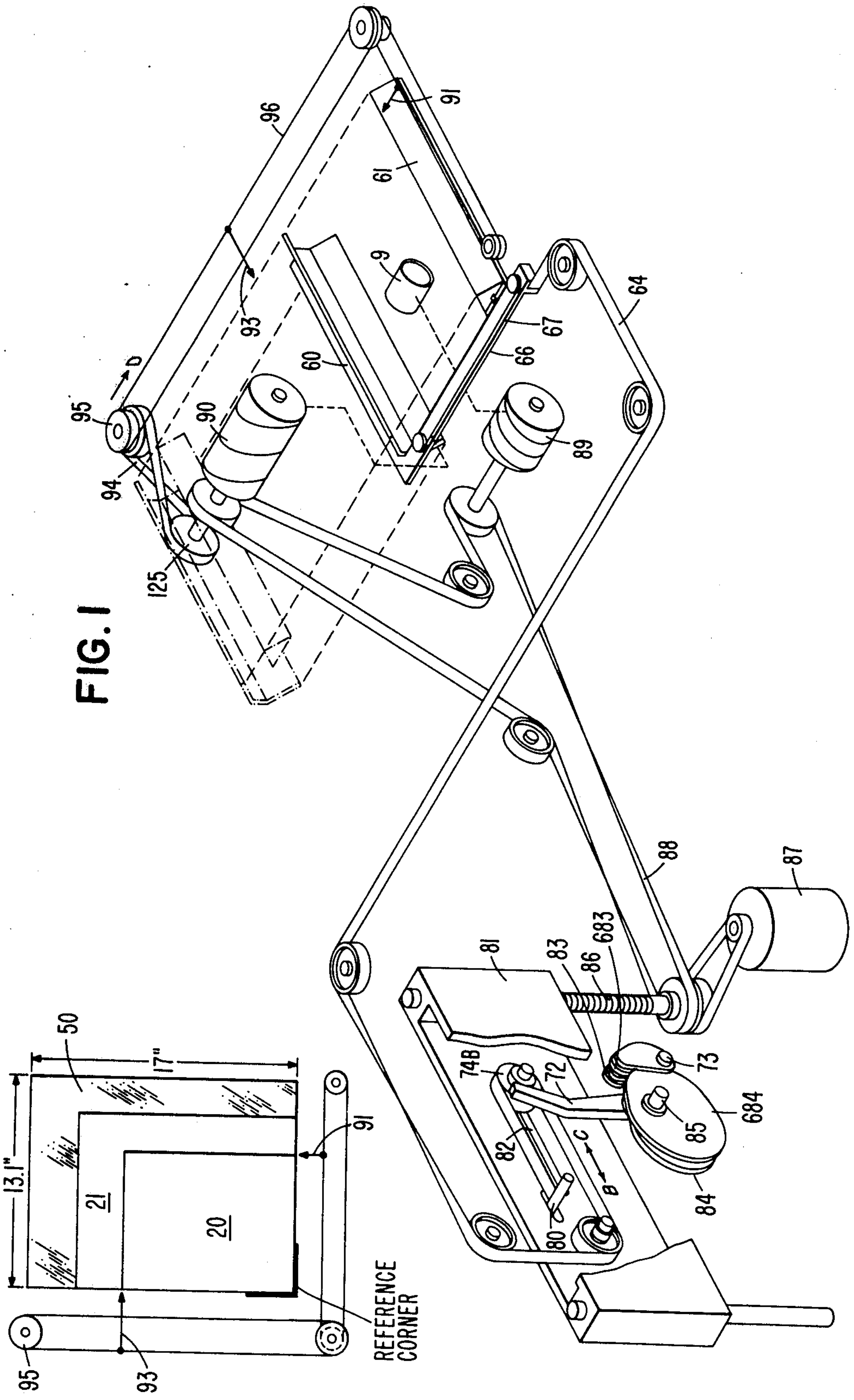
FIG. 1 shows a diagrammatic embodiment of the continuously variable optics drive system of this invention.
FIG. 1*a* shows documents positioned on the document glass.

FIGS. 1 and 1*a* are nearly identical to FIGS. 5 and 5*a* of the patent application, mentioned above, incorporated herein by reference.

FIG. 1 shows an optics drive system consisting generally of cams 84 and 684, associated cam followers 83 and 683, drive shaft 85 from the main motor (not shown), shaft 73, drive arm 72 mounted on shaft 73, and drive carriage 74 of which pulley 74B is shown in FIG. 1. Drive cable 64 passes around pulley 74B to a variable ground point 80 and is attached at its other end to arm 66 of L-shaped scan carriage 60. A second scanning carriage 61 is connected by cable 67 to carriage 60 in a manner such that it travels during scan at twice the speed of carriage 60 in the manner well known in the art.

FIG. 1 also shows an optics positioning system, including positioning motor 87 and positioning cable 88. Cam 89 adjusts the position of lens 9 in a manner such that continuously variable positioning of the lens is provided. Cam 90 is provided to continuously adjust the relative positions of carriages 60 and 61 prior to the beginning of a scanning motion in order to adjust the total conjugate length (TCL) of the optical path in a manner which corresponds to the magnification setting provided by the positioning of lens 9. Pulley 125 and cable 94 provide motion through pulley 95 to cable 96. In that manner, referring to FIG. 1*a*, reduction indicators 91 and 93 are positioned to frame documents 20, 21, or any other size document which fits on document glass 50. Note that the optical system of FIGS. 1 and 1*a* shows documents referenced at a corner; the invention is equally applicable to a system in which documents are referenced at a single reference edge along a centerline.

FIG. 1 also shows the positioning of truck 81 by positioning motor 87 through leadscrew 86. In that manner, truck 81 is moved in a vertical direction such that follower 74B is moved vertically along drive arm 72. Once again, the position of follower 74B along drive arm 72 is synchronized with the motion of reduction indicators 91 and 93, the movement of lens 9, and the TCL adjustment provided by cam 90. Thus, the entire system is set up for operation prior to the beginning of scanning motion.

It may be observed that when scanning motion commences the speed and length of scan traveled by scanning carriages 60 and 61 is related to the vertical positioning of follower 74B along drive arm 72. If follower 74B is near the top of drive arm 72, as pictured in FIG. 1, then the travel of follower 74B and carriages 60 and 61 is relatively long and fast. If follower 74B is positioned near the bottom of drive arm 72, the speed and the length of scan of carriages 60 and 61 is slower and shorter. Thus, a system is provided for varying the speed and length of scan in a continuously variable manner by positioning follower 74B along drive arm 72.

Figure 2:
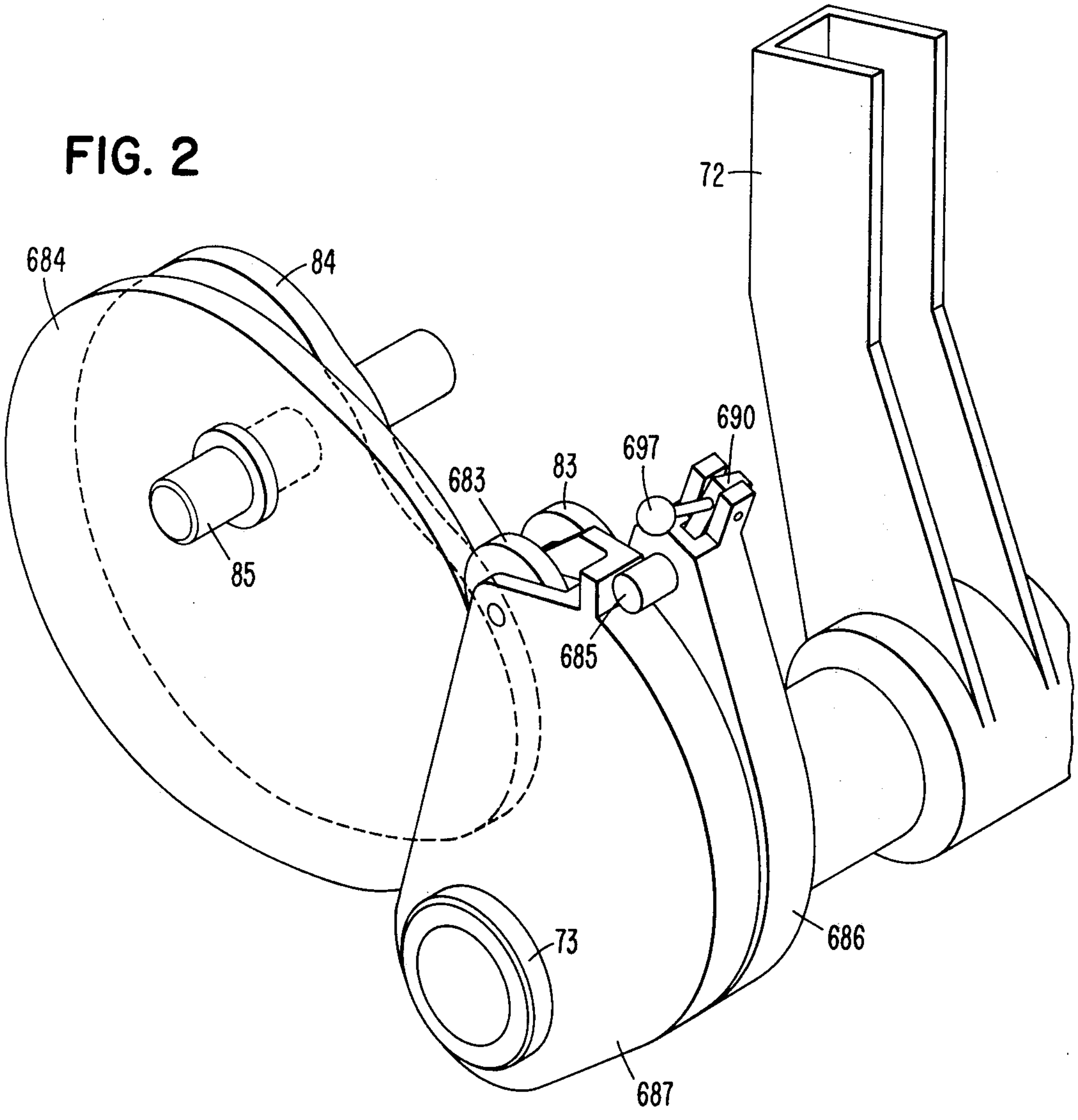
FIG. 2 is another perspective view of the twin-cam embodiment of this invention.

FIG. 2 is another perspective view of the twin-cam embodiment shown in FIG. 1. In this view, cam followers 83 and 683 are shown separately mounted to follow their respective cams. Cam 684 is, for example, a cam which provides a scanning motion of 11 inches to the scan carriages at a 1:1 reduction ratio, while cam 84 provides a 14-inch motion to the scan carriages at a 1:1 ratio. Thus, if 11-inch copy paper is placed in the paper bin of a copy machine and a 1:1 ratio is selected, cam 684 and cam follower 683 would be selected. If legal size copy paper were placed in the paper bin of the copy machine and a 1:1 reduction ratio were desired, then cam 84 and cam follower 83 would be selected.

In the operation of this mechanism, as drive shaft 85 from the main motor is rotated, both cams 84 and 684 are rotated therewith. If cam selection pin 685 is in the engaged position as shown in FIG. 2, cam followers 83 and 683 turn as a single unit. Thus, since cam 684 is larger than cam 84, the actual input to drive arm 72 is from the shape of cam 684, i.e., the cam which is designed for 11-inch copy paper.

If it is desired to use cam 84 for 14-inch copy paper, selection pin 685 will be withdrawn from the engaged position. While the cam follower 683, which is mounted on arbor 687, continues to follow the profile of cam 684, it does not influence the rotation of shaft 73. The reason for this is that arbor 687 is not rigidly fastened to shaft 73, but instead is free to rotate around shaft 73. On the other hand, arbor 686, upon which cam follower 83 is mounted, is rigidly fastened to shaft 73, and thus as the cam units 84 and 684 rotate, cam follower 83 follows the profile of cam 84 and imparts that motion to shaft 73 and drive arm 72. In that manner, the carriages 60 and 61, FIG. 1, are caused to scan a distance of 14 inches at a 1:1 magnification ratio. When the copy machine has completed its cycle and has returned to the rest position as shown in FIG. 2, arbors 686 and 687 are again aligned such that pin 685 may be inserted into an engaged position connecting the two arbors together so that it is now possible to switch to the 11-inch cam.

Selection pin 685 is operated by a solenoid (see FIG. 4) which is controlled by the size of copy paper which the operator desires to use. That selection may be made by pushbutton or automatically by copy paper length sensors located in a copy paper bin.

Figure 3:
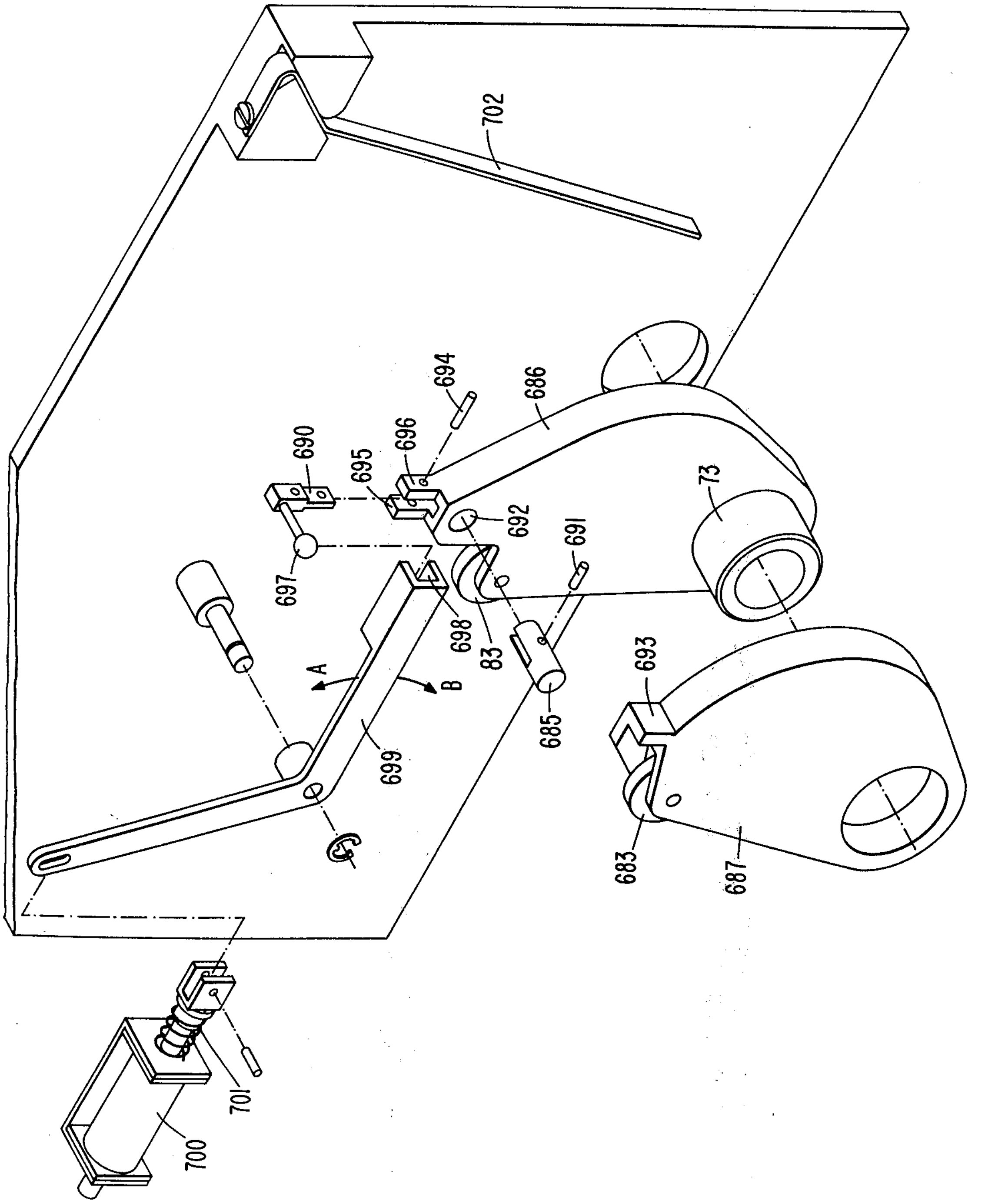
FIG. 3 is an exploded view of the cam-select mechansim.

FIG. 3 is an exploded view showing the details of the selection mechanism which shifts from one cam to the other. Selection pin 685 is fastened to T-bar 690 by pin 691. Selection pin 685 fits into hole 692 in arbor 686 and moves a short distance in front of buttress 693 on arbor 687 when it is desired to engage the two cams for joint revolution.

T-bar 690 is pivoted in arbor 686 by pin 694 which passes through ears 695 and 696. T-bar 690 is driven by its connection to ball 697 which is entrapped in slot 698. Slot 698 is a part of pivoted arm 699 which is driven in one direction by solenoid 700 and in the other direction by spring 701.

Spring 702 is fastened to the machine frame and provides a bias force to hold arbor 687 and cam follower 683 against the profile of cam 684 when selection pin 685 is not engaged with arbor 687. This is necessary to prevent arbor 687 from falling away from the cam since, as mentioned above, arbor 687 is free to rotate on shaft 73.

In operation, when solenoid 700 is energized, arm 699 rotates around its pivot in direction A. As it moves, ball 697 is lifted upwardly, causing T-bar 690 to rotate on its pivot pin 694 and push selection pin 685 in front of buttress 693. In that manner, selection pin 685 engages both arbors and 687 with the result that cam follower 83 is lifted off the surface of cam 84 when cams 684 and 84 are rotated (better observed in FIG. 2). Thus, in this case, the input motion to shaft 73 follows the path cam 684, cam follower 683, arbor 687, selection pin 685, arbor 686, and shaft 73.

When solenoid 700 is de-energized, arm 699 rotates around its pivot in direction B. This causes ball 697 to be forced downwardly, causing T-bar 690 to rotate around its pivot pin 694 to pull pin 685 out of engagement with arbor 687. Now when cams 84 and 684 are rotated, cam follower 83 is free to follow the profile of cam 84. In this case, the input motion to shaft 73 follows the path cam 84, cam follower 83, arbor 686, and shaft 73.

Figure 4:
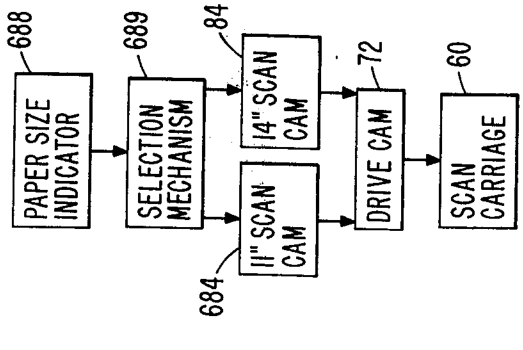
FIG. 4 is a block diagram of the selection circuit.

FIG. 4 shows a block diagram of the system in which the copy paper size indicator is shown at 688, controlling the selection mechanism 689. Either cam 84 or cam 684 is selected by the selection mechanism 689 to provide mechanical motion input to drive arm 72. That, in turn, controls the length of scan of the scan carriage 60.

If a reduction ratio different from 1:1 is to be selected, and 11-inch copy paper is in the copy paper bin, cam 84 is again the selected cam which provides mechanical input to the drive arm as before. The difference in the system is now the positioning of the follower 74B in a vertical direction along drive arm 74 as explained above. Similarly, if documents larger than 14 inches are to be reduced in size to fit onto 14-inch copy paper, cam 684 is selected by selecting mechanism 689, to provide mechanical input to drive arm 72. Once again, the adjustments to the speed and length of scan are made by the vertical positioning of follower 74B along drive arm 72.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a document copier with a continuously variable reduction optical system, an optical drive system comprising:

a drive motor;

a shaft connected to said drive motor with multiple cams rigidly fastened thereto;

cam follower means connected to an input shaft;

cam selection means by which one of said cams and cam followers is selected for providing motion to said input shaft, the selection in accordance with the size of copy paper selected;

scanning optical carriages; and means connecting said input shaft to said scanning optical carriages, whereby said carriages are caused to scan the document to be copied at variable speeds and over variable lengths, the length of scan not substantially exceeding the size of the document.

2. The system of claim 1 wherein said cam and associated cam followers are two in number and wherein a first of said cam followers is rigidly attached to said input shaft while the second of said cam followers is rotatably mounted upon said shaft.

3. The system of claim 2 wherein said second cam follower is pinned to said first cam follower by said cam selection means when said input shaft is to be rotated under the influence of said second cam follower.

4. The system of claim 3 wherein said cam selection mechanism comprises a selection pin, an arm connected to said selection pin, and a solenoid connected to said arm for operating said selection pin, said solenoid being energized in accordance with the copy paper size placed in a paper bin.

5. In a document copier machine, an optical drive system comprising:

a drive motor;

multiple-cam means connected to said drive motor for providing a variety of output motion;

cam selection means for providing a selected cam means in accordance with the size of copy paper being used;

carriage means for scanning a document; and means for connecting the selected cam to said carriage means, whereby said carriage means is caused to scan said document at a variety of speeds and distances.

* * * * *